Patented Mar. 14, 1944

2,344,404

UNITED STATES PATENT OFFICE 2,344,404

CORROSION PREVENTING AGENT

Franz Giloy, Dessau, Germany; vested in the Alien Property Custodian

No Drawing. Application October 17, 1940, Serial No. 361,581. In Germany October 21, 1939

6 Claims. (Cl. 167—22)

This invention relates to corrosion preventing agents and particularly to protecting metals against corrosion by water. A further object of the invention is to protect metals against corrosion by water containing fluids and solutions.

It has been found that the corrosion of metals and metallic articles particularly of those made of iron, iron alloys or steel occurring in the presence of water, water containing fluids and solutions with a pH value lying not below 6.5 is prevented by adding to said liquids the water soluble salts of ether carboxylic acids cf the general formula $(R.O.)_x.R'.COOH$. In this general formula R stands for any organic radical containing at least 4 carbon atoms which may also be cyclically arranged and which may be interrupted by hetero atoms or hetero atom groups, whereas R' means an alkylene radical which may also be substituted and $x$ the numbers 1 or 2.

Ether carboxylic acids of this kind are, e. g., butyloxy acetic acid, i-amyloxy acetic acid, mixtures of alkoxy acetic acids obtainable from mixtures of alcohols obtained by reduction of first running acids of the paraffin oxidation or obtained as high boiling portions at the methanol synthesis, octyloxy acetic acid, dodecyloxy acetic acid, cyclohexyloxy acetic acid, tetrahydrofurfuryloxy acetic acid, phenoxy acetic acid, cresoxy acetic acid, aryloxy fatty acids alkylated or cycloalkylated in the nucleus, naphthenyloxy acetic acids, abietyloxy acetic acids, benzyloxy acetic acid, tetrahydromenaphthyloxy acetic acid, dioctyloxy acetic acid, α-heptyloxy propionic acid, i-octyloxy propionic acid, γ-octyloxy-iso-butyric acid, α-octyloxy capric acid and the like. Furthermore alkoxy fatty acids may be used, which are obtained from secondary alcohols by converting with halogen fatty acids, the alcohols being obtained from the first running acids of the paraffin oxidation with 7 to 9 carbon atoms by etonizing and subsequent hydrogenizing or such alkoxy fatty acids, which are obtained by reacting alcoholates of the primary alcohols $C_7$—$C_9$ with α-halogen fatty acids such as α-butoxy lauric acid, 6-hydroxy-n-hexyloxy acetic acid, methoxy-hexyloxy acetic acid and the like. Among these ether carboxylic acids the alkoxy and cycloalkoxy fatty acids are to be preferred.

In aqueous solution the salts of those acids which may be formed with alkali, earth alkali and earth metals, ammonia or organic bases, prevent the corrosion of metals particularly of iron, iron alloys and steel and of articles made thereof. The concentration of the salts of the ether carboxylic acids in the water may vary within wide limits, it amounts to 0.01-5 percent and more related to the water.

The anticorrosive effect is obtained not only in water but also in water containing fluids and solutions having a pH value of 6.5 or more. Therefore the water may have addition agents which have a neutral, weak acid or alkaline character and which may act in a certain extent corroding such as acetone, methanol, ethanol, butanol, glycerine and the like, as well as aqueous metal salt solutions such as solutions of ammonium chloride, calcium chloride or acetate of alumina.

Furthermore the water may contain known disinfecting means such as dimethylamino-acetic acid-dodecylamide-chlorobenzylate, piperidine-acetic acid-dodecylester-chlorobenzylate, dimethyl-dodecyl-benzyl-ammonium-chloride, dimethyl-dodecyl-amino-acetate, 4-isooctylphenol-dimethyl-amino-ethyl-ether-chloro-benzylate.

The aforedescribed corrosion preventing agents may also be applied in combination with other known and equally efficient agents such as chromates, nitrites or triazotates.

The corrosion preventing agents are used for water or any water containing fluids or solutions which are in contact with metals particularly iron or iron articles such as water containing fluids and fluid mixtures for technical apparatuses as gas meters, aqueous systems of heating and refrigerating apparatuses, aqueous systems of internal combustion engines, aqueous systems of break and pressure devices, for shock absorbers, driving gears and the like. Furthermore the anticorrosive agents can be added to water containing fluids for cleaning and preserving razor apparatuses, razor blades and medical instruments. Finally the agents may be used for preparations for working metals such as aqueous oil emulsions for boring or cutting metals, lubricating emulsions and the like.

Example 1

In a 1% aqueous solution of piperidino-acetic acid-dodecyl-ester-chlorobenzylate containing moreover 3 to 4% of the ammonium salts of a mixture of alkoxy acetic acids the alkyl groups of which have 7 to 9 carbon atoms, any metallic articles e. g. razor blades, remain absolutely stainless even after a several days' standing. At the contrary, without the addition of said ammonium salt the forming of rust spots will be observed already within a few hours.

Example 2

67 parts by weight of a mineral oil are mixed while stirring with 33 parts by weight of the ammonium salt of the butoxy acetic acid, whereupon 4 parts by weight of ammonia (25%) are gradually added. The mixture is stirred until a clear suspension is obtained. 2 parts by weight of this mixture are stirred in 100 parts of water forming a rust preventing emulsion which may be used as lubricating and boring oil.

I claim:

1. A composition substantially non-corrosive to metals comprising a solution of a small amount of a salt of an ether carboxylic acid in water containing metal corroding materials, said solution having a pH of at least 6.5.

2. A composition substantially non-corrosive to metals comprising a solution of a metal corroding disinfectant and a salt of an ether carboxylic acid in water, said solution having a pH of at least 6.5.

3. A process for preventing the corrosion of a metal in contact with a fluid containing water which comprises adding to said fluid a small amount of a salt of an ether carboxylic acid to form an aqueous solution of said salt, said solution having a pH of at least 6.5.

4. An aqueous solution substantially non-corrosive to metals containing a disinfecting agent and a salt of an alkoxy acetic acid, the alkoxy group containing from 7 to 9 carbon atoms, the solution having a pH of at least 6.5.

5. A process for minimizing the corrosion of a metal in contact with a fluid containing water and a mineral oil which comprises adding to said fluid a salt of butoxy acetic acid, said fluid having a pH of at least 6.5.

6. A process for minimizing the corrosion of a metal containing iron when in contact with water containing impurities leaving a pH of at least 6.5 which comprises adding to the water a small amount of a salt of alkoxy acetic acid containing at least 4 carbon atoms in the alkyl group.

FRANZ GILOY.